(12) United States Patent
Ge et al.

(10) Patent No.: US 10,036,137 B2
(45) Date of Patent: Jul. 31, 2018

(54) AUTONOMOUS LOADING SYSTEM AND METHOD FOR OPERATING SAME

(71) Applicant: Caterpillar Inc., Paoria, IL (US)

(72) Inventors: Xinyu Ge, Peoria, IL (US); Jia Li, Peoria, IL (US); Hao Wu, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 111 days.

(21) Appl. No.: 15/211,793

(22) Filed: Jul. 15, 2016

(65) Prior Publication Data

US 2018/0016767 A1 Jan. 18, 2018

(51) Int. Cl.
| | |
|---|---|
| *G06F 7/70* | (2006.01) |
| *G06F 19/00* | (2018.01) |
| *G06G 7/00* | (2006.01) |
| *G06G 7/76* | (2006.01) |
| *E02F 3/43* | (2006.01) |
| *G01F 17/00* | (2006.01) |
| *G01M 1/12* | (2006.01) |

(52) U.S. Cl.
CPC .............. *E02F 3/434* (2013.01); *G01F 17/00* (2013.01); *G01M 1/122* (2013.01)

(58) Field of Classification Search
CPC .......... E02F 3/434; G01F 17/00; G01M 1/122
USPC .......................................................... 701/50
See application file for complete search history.

(56) References Cited

U.S. PATENT DOCUMENTS

| | | | | |
|---|---|---|---|---|
| 6,157,889 A * | 12/2000 | Baker | .................... | G01G 19/12 37/348 |
| 8,386,134 B2 * | 2/2013 | Morey | .................... | G01G 19/10 172/430 |
| 8,833,861 B2 * | 9/2014 | Donnelli | ................. | G01P 15/00 298/17 S |
| 9,376,116 B1 * | 6/2016 | Ge | ......................... | F16F 15/02 |
| 9,792,739 B2 * | 10/2017 | Thomsen | ............... | G07C 5/008 |
| 2014/0324303 A1 * | 10/2014 | Tejeda | .................... | B60P 1/045 701/51 |
| 2016/0003171 A1 * | 1/2016 | Ge | ........................ | E02F 9/2246 701/102 |
| 2016/0057004 A1 | 2/2016 | Ge | | |
| 2016/0196749 A1 * | 7/2016 | Chen | ................ | G08G 1/096716 701/2 |
| 2016/0238130 A1 * | 8/2016 | Ge | ......................... | F16H 61/47 |
| 2017/0122792 A1 * | 5/2017 | Tejeda | ................... | G01G 19/12 |

\* cited by examiner

*Primary Examiner* — Harry Y Oh

(74) *Attorney, Agent, or Firm* — Miller, Matthias & Hull

(57) ABSTRACT

A hauling machine is disclosed. The hauling machine may include a dump body and an inertial measurement unit (IMU) disposed proximate to the dump body. The IMU may be configured to measure an impact of a payload material on the dump body during a first load cycle, and generate impact data based on the impact of the payload material. The hauling machine may also include a controller in operative communication with the IMU. The controller may be configured to: receive the impact data from the IMU, estimate a center of gravity, a net load, and an amplitude of the impact of the payload material based on the impact data, and determine a desired dumping point of the payload material into the dump body for a second load cycle based on the center of gravity, the net load, and the amplitude of the impact.

20 Claims, 5 Drawing Sheets

AUTONOMOUS LOADING SYSTEM AND METHOD FOR OPERATING SAME

FIELD OF THE DISCLOSURE

The present disclosure relates generally to loading machines and, more particularly, to systems and methods for autonomous loading.

BACKGROUND OF THE DISCLOSURE

In worksites, such as, excavation sites, a loading machine may be used to load a payload material onto a hauling machine, which may, in turn, transport the payload material to a dump site. Examples of loading machines may include but not be limited to excavators, front shovels, electric rope shovels, hydraulic mine shovels, loaders, and the like. Examples of hauling machines may include but not be limited to mining trucks, dump trucks, freight trains, and the like.

Typically, a load cycle may include filling a bucket of the loading machine with a load of the payload material and depositing the load from above into a dump body of the hauling truck. Depending on a density, a consistency, and a dumping point of the payload material, impact stresses and uneven loading may be imparted onto the hauling machine. Such high vibration, impact stresses, and uneven loading of the payload material may cause non-uniform and excessive wear of the hauling machine.

Recently, there has been contemplation for semi-autonomous and autonomous operation of the loading machines. However, human intervention may still be needed in certain situations, such as to help prevent high vibration, impact stresses, and uneven loading of the payload material. For example, operators may be needed to monitor loading of the payload material through computer vision techniques.

A system for distributing a weight of material loaded onto a haulage truck uniformly among a vehicle's tires is disclosed in U.S. Pat. No. 6,157,889, entitled, "Load Distribution System for Haulage Trucks." In the '889 patent, weight sensors are coupled to a bed of a conventional haulage truck. The '889 weight sensors measure the weight applied to each tire strut as the truck is being loaded. Based on the weight applied to each strut, the exact position of the center of gravity of the load in the truck's bed is calculated and displayed on a monitor. An operator of the loading machine then completes the loading operation based on this information.

However, the '889 patent does not disclose a loading performance monitor system that provides guidance for autonomous loading. In fact, the '889 patent does not disclose autonomous loading.

SUMMARY OF THE DISCLOSURE

In accordance with one aspect, a hauling machine is disclosed. The hauling machine may include a dump body and an inertial measurement unit (IMU) disposed proximate to the dump body. The IMU may be configured to measure an impact of a payload material on the dump body during a first load cycle, and generate impact data based on the impact of the payload material. The hauling machine may also include a controller in operative communication with the IMU. The controller may be configured to: receive the impact data from the IMU, estimate a center of gravity, a net load, and an amplitude of the impact of the payload material based on the impact data, and determine a desired dumping point of the payload material into the dump body for a second load cycle based on the center of gravity, the net load, and the amplitude of the impact.

In accordance with another aspect, a system for autonomous loading of a payload material from a loading machine onto a hauling machine is disclosed. The system may include an inertial measurement unit (IMU) disposed on a dump body of the hauling machine. The IMU may be configured to: measure an impact of the payload material on the dump body during a first load cycle, and generate impact data based on the impact of the payload material. The system may further include a hauling machine controller in operative communication with the IMU. The hauling machine controller may be configured to: receive the impact data from the IMU, estimate a center of gravity, a net load, and an amplitude of the impact of the payload material based on the impact data, and determine a desired dumping point of the payload material into the dump body for a second load cycle based on the center of gravity, the net load and the amplitude of the impact.

The system may further include a loading machine controller in operative communication with an implement of the loading machine. The loading machine controller may be configured to cause the implement to load the payload material into the dump body of the hauling machine. The system may further include a communication module configured to send signals between the hauling machine controller and the loading machine controller. The loading machine controller may be further configured to receive signals indicative of the desired dumping point from the communication module, and position the implement according to the desired dumping point for the second load cycle.

In accordance with another aspect, a method for autonomous loading of a payload material from a loading machine onto a hauling machine is disclosed. The method may include measuring an impact of the payload material on a dump body of the hauling machine in a first load cycle, the measuring being performed by an inertial measurement unit (IMU); estimating a center of gravity and a net load for a second load cycle based on measurements from the IMU, the estimating being performed by a hauling machine controller; generating an amplitude of the impact in the first load cycle based on measurements from the IMU, the generating being performed by the hauling machine controller; determining a desired dumping point for the second load cycle based on the center of gravity, the net load, and the amplitude of the impact in the first load cycle, the determining being performed by the hauling machine controller; communicating the desired dumping point for the second load cycle to a loading machine controller, the communicating being performed by a communication module associated with the loading machine and the hauling machine; and positioning an implement of the loading machine according to the desired dumping point for the second load cycle, the positioning being performed by the loading machine controller.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Figure 1:
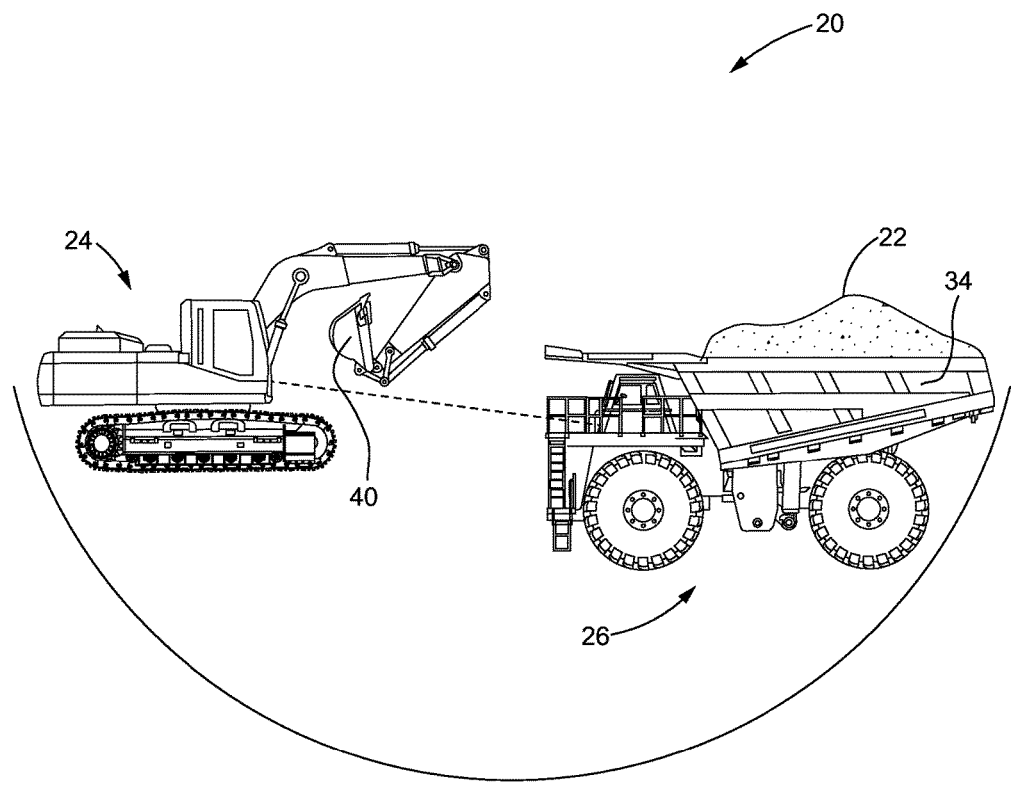
FIG. 1 is a diagram of a worksite, in accordance with one aspect of the present disclosure.

Referring now to the drawings, and with specific reference to FIG. 1, a worksite 20 is shown, in accordance with certain aspects of the present disclosure. For example, the worksite 20 may be an excavation site, a construction site, and/or any other type of worksite. Various tasks may be performed at the worksite 20 including loading operation and/or other operations. For instance, the worksite 20 may include a payload material 22, which may be loaded by a loading machine 24 onto a hauling machine 26 for removal from the worksite 20.

Although the loading machine 24 is illustrated as an excavator and the hauling machine 26 is illustrated as a mining truck, the loading machine 24 and/or the hauling machine 26 may be of any other type of machine. As used herein, the term "machine" may refer to a mobile or stationary machine that performs an operation involving physical movement associated with a particular industry, such as, without limitation, mining, construction, landscaping, forestry, transportation, agriculture, etc.

Non-limiting examples of machines include excavators, front shovels, electric rope shovels, hydraulic mine shovels, loaders, mining trucks, dump trucks, freight trains, and/or other types of machines that operate in a work environment. It is also to be understood that the machines 24, 26 are shown primarily for illustrative purposes to assist in disclosing features of various aspects of the present disclosure, and that FIG. 1 does not depict all of the components of the machines.

Figure 2:
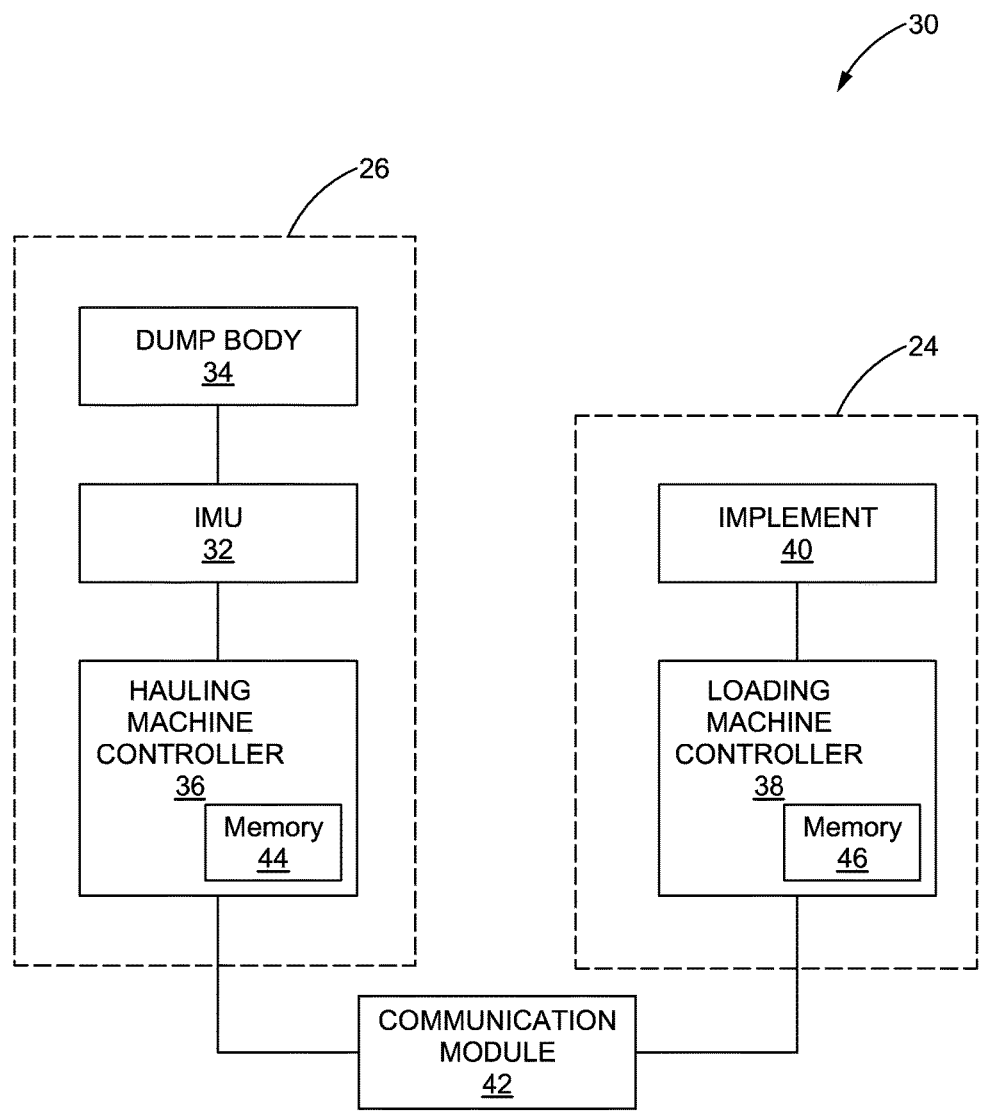
FIG. 2 is a schematic representation of a system for autonomous loading of a payload material from a loading machine onto a hauling machine, in accordance with one aspect of the present disclosure.

Turning now to FIG. 2, with continued reference to FIG. 1, a schematic representation of a system 30 for autonomous loading of the payload material 22 from the loading machine 24 to the hauling machine 26 is shown, in accordance with another aspect. The system 30 may include an inertial measurement unit (IMU) 32 disposed on a dump body 34 of the hauling machine 26, a hauling machine controller 36 in operative communication with the IMU 32, a loading machine controller 38 in operative communication with an implement 40 of the loading machine 24, and a communication module 42 configured to send signals between the hauling machine controller 36 and the loading machine controller 38. The implement 40 may comprise a bucket, or other tool, mounted on one or more linkages.

The IMU 32 may comprise an electronic device that measures and provides signals to the hauling machine controller 36 indicative of a position, velocity, motion, and orientation of the dump body 34 of the hauling machine 26. More specifically, the IMU 32 may be configured to measure an impact of the payload material 22 on the dump body 34 of the hauling machine 26 and generate impact data. The IMU 32 may use a combination of accelerometers, gyroscopes, and/or magnetometers. For instance, the IMU 32 may include an accelerometer on each corner of the dump body 34 of the hauling machine 26. However, other numbers of sensors and types of configurations for the IMU 32 may be used.

Each of the hauling machine controller 36 and the loading machine controller 38 may be implemented using one or more of a processor, a microprocessor, a microcontroller, a digital signal processor (DSP), a field-programmable gate array (FGPA), an electronic control module (ECM), an electronic control unit (ECU), and a processor-based device that may include or be associated with a non-transitory computer readable storage medium having stored thereon computer-executable instructions, or any other suitable means for electronically controlling functionality of the hauling machine 26 and the loading machine 24, respectively.

For example, each of the hauling machine controller 36 and the loading machine controller 38 may be configured to operate according to predetermined algorithms or sets of instructions for operating the system 30. Such algorithms or sets of instructions may be programmed or incorporated into or stored in a memory 44 associated with or at least accessible to the hauling machine controller 36 and a memory 46 associated with or at least accessible to the loading machine controller 38. Each of the memory 44 and the memory 46 may comprise a non-volatile memory provided within and/or external to the hauling machine controller 36 and the loading machine controller 38, respectively. It is understood that the hauling machine controller 36, the loading machine controller 38, and the system 30 may include other hardware, software, firmware, and/or combinations thereof.

The communication module 42 may be configured to send signals between the hauling machine controller 36 and the loading machine controller 38. The communication module 42 may allow machine-to-machine communication between the hauling machine 26 and the loading machine 24. For example, the communication module 42 may be configured according to that disclosed in commonly-assigned U.S. Patent Application Publication No. 2016/0057004 A1, entitled, "Systems and Methods for Machine-to-Machine Ad-Hoc Communication." However, other configurations for the communication module 42 may be used. In some implementations, the communication module 42 may be included in the hauling machine 26. Additionally, or alternatively, the communication module 42 may be included in the loading machine 24. Additionally, or alternatively, the communication module 42 may be included in another machine and/or another device.

Figure 3:
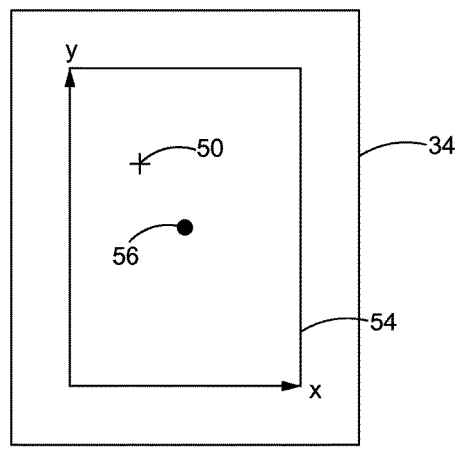
FIG. 3 is a top view of a predetermined control zone in a dump body of a hauling machine, in accordance with one aspect of the present disclosure.
Figure 4:
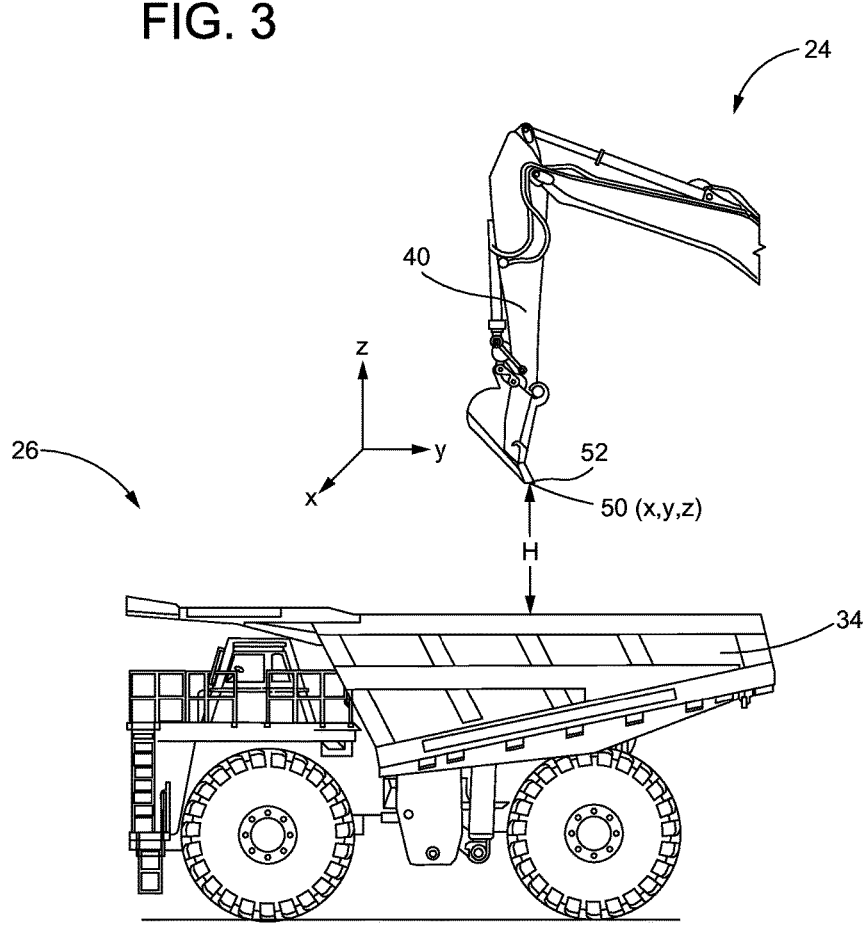
FIG. 4 is a diagram of a perspective view of part of the loading machine and the hauling machine of FIG. 2, in accordance with one aspect of the present disclosure.

In an example, the hauling machine controller 36 may process information from the IMU 32 in order to provide guidance for autonomous loading by the loading machine controller 38. More specifically, based on measurements from the IMU 32 of the impact of the payload material 22 during a first load cycle, the hauling machine controller 36 may determine a desired dumping point for a subsequent or second load cycle. As shown in FIGS. 3 and 4, the desired dumping point 50 may include three-dimensional coordinates (x, y, z) for a location of an end 52 of the implement 40 of the loading machine 24 relative to the dump body 34 of the hauling machine 26.

The hauling machine controller 36 may send signals indicative of the desired dumping point 50 to the communication module 42, which may then communicate the same to the loading machine controller 38. In turn, the loading machine controller 38 may position the implement 40 according to the desired dumping point 50 for the second load cycle. In so doing, the system 30 may provide for autonomous loading of the payload material 22 from the implement 40 of the loading machine 24 to the dump body 34 of the hauling machine 26, while minimizing high vibration, impact stresses, and uneven loading.

Figure 5:
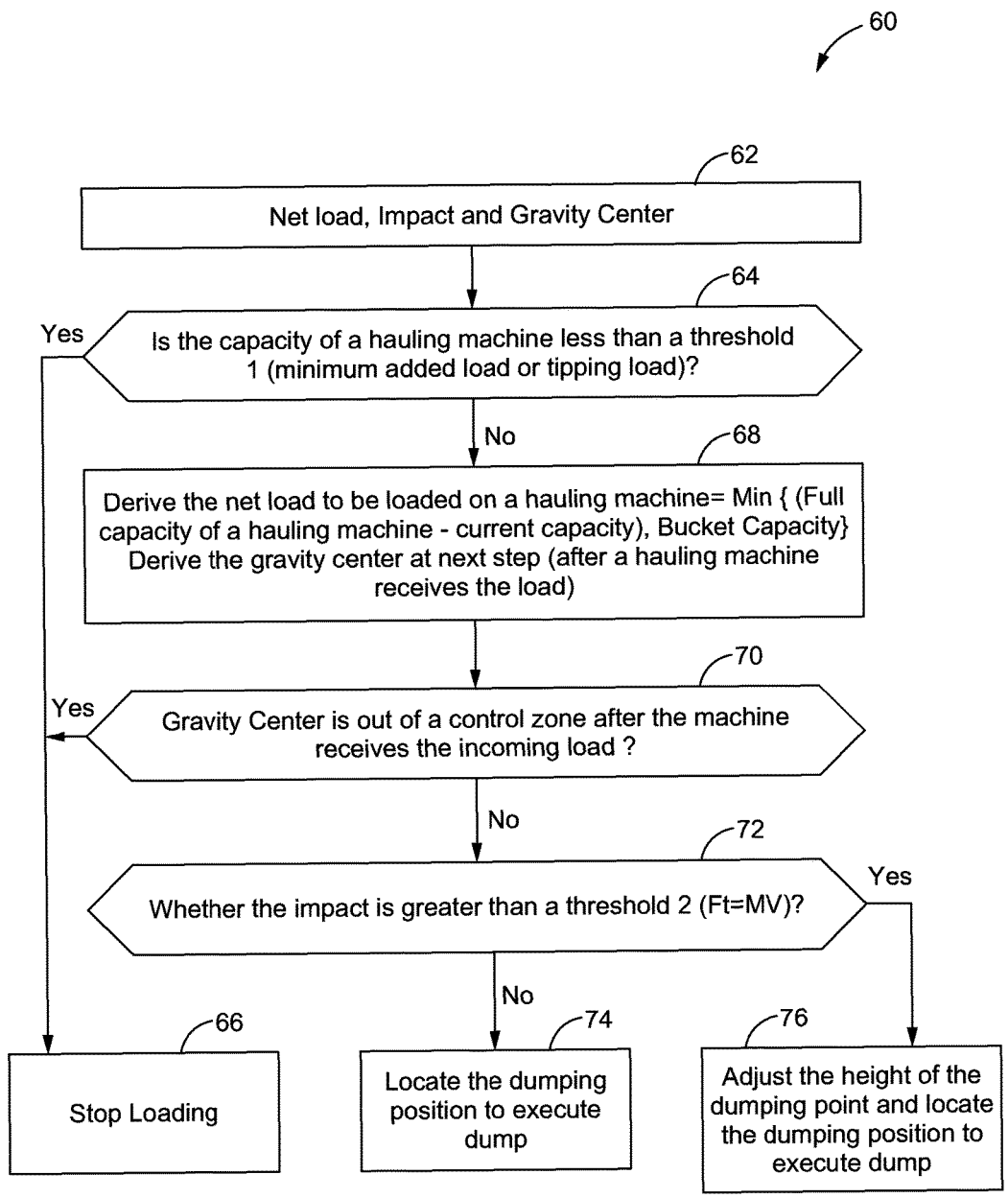
FIG. 5 is an example flowchart illustrating an example algorithm or process for autonomous loading of a payload material from a loading machine onto a hauling machine, in accordance with one aspect of the present disclosure.

Referring now to FIG. 5, with continued reference to FIGS. 1-4, an example flowchart 60 illustrating an example algorithm or process for autonomous loading of the payload material 22 from the loading machine 24 onto the hauling machine 26. The algorithm or process may be included in the system 30, such as via programming into the memory 44 and the memory 46 of the hauling machine controller 36 and the loading machine controller 38, respectively. At block 62, the hauling machine controller 36 may estimate a center of gravity, a net load, and an amplitude of the impact of the payload material 22 during the first load cycle based on the measurements and the impact data from the IMU 32.

At block 64, the hauling machine controller 36 may determine whether the dump body 34 is at a full capacity based on the net load estimated for the first load cycle from block 62. More specifically, the hauling machine controller 36 may determine whether a capacity of the dump body 34 of the hauling machine 26 is less than a first predetermined threshold preprogrammed into (or stored in) the memory 44 associated with the hauling machine controller 36. For example, the capacity of the dump body 34 may be a capacity that is open to receiving more of the payload material 22 (or an open capacity of the dump body) and the first predetermined threshold may be a minimum added load, or a tipping load.

The minimum added load, or the tipping load, may be a minimum amount of the payload material 22 that is predetermined during calibration to be cost-effective taking into consideration factors, such as a capacity of the implement 40, a work cycle efficiency of performing another dig, lift, and swing, and/or the like. Continuing the example, if the capacity of the dump body 34 is less than the first predetermined threshold, then the flowchart 60 may proceed to block 66. At block 66, loading may be stopped after the first load cycle because there may not be capacity in the dump body 34 to hold the minimum added load.

More specifically, the hauling machine controller 36 may send signals to the communication module 42 to communicate to the loading machine controller 38 to stop loading of the payload material 22. The loading machine controller 38 may receive the signals from the communication module 42 to stop loading and correspondingly stop autonomous loading of the implement 40. If the capacity of the dump body 34 is greater than or equal to the first predetermined threshold, then the flowchart 60 may proceed to block 68.

At block 68, the hauling machine controller 36 may derive a net load to be loaded on the dump body 34 of the hauling machine 26 for the second load cycle. For instance, the net load for the second load cycle may be a minimum of the full capacity minus a current capacity of the dump body 34 of the hauling machine 26 (or the open capacity of the dump body 34) and a bucket capacity of the implement 40 of the loading machine 24. Each of the full capacity and the bucket capacity may be predetermined based on dimensions of the hauling machine 26 and the loading machine 24, respectively, and may be stored in the memory 44 associated with the hauling machine controller 36. The current capacity of the dump body 34 may be determined based on measurements from the IMU 32, such as the net load estimated for the first load cycle from block 62. More specifically, the open capacity of the dump body 34 may be calculated by subtracting the current capacity from the fully capacity.

At block 70, the hauling machine controller 36 may derive a center of gravity for the second load cycle. For this derivation, the hauling machine controller 36 may use the net load and the center of gravity estimated for the first load cycle from block 62, as well as the net load for the second load cycle derived from block 68. Furthermore, the hauling machine controller 36 may determine whether the center of gravity for the second load cycle is outside of a predetermined control zone 54 (FIG. 3), stored in the memory 44 associated with the hauling machine controller 36. The predetermined control zone 54 may be a desired zone of tolerance for the center of gravity of the hauling machine 26 determined during calibration.

For example, using the net load and the center of gravity estimated for the first load cycle from block 62 and the net load for the second load cycle from block 68, the hauling machine controller 36 may perform a sweep within the predetermined control zone 54. The sweep may determine whether the net load after the second load cycle yields a center of gravity within the predetermined control zone 54. The sweep may also yield an optimized point in (x, y) coordinates that brings the center of gravity proximate a center 56 (FIG. 3) of the predetermined control zone 54. The hauling machine controller 36 may use a tree span algorithm, or a tree search, in order to perform the sweep.

Continuing the example, if the center of gravity is outside of the predetermined control zone 54, then the flowchart 60 may proceed to block 66 and loading may be stopped after the first load cycle because the net load after the second load cycle may cause the hauling machine to be unstable. If the center of gravity is within the predetermined control zone 54, then the flowchart 60 may proceed to block 72. At block 72, the hauling machine controller 36 may determine whether the amplitude of the impact of the payload material 22 during the first load cycle, from block 62, is greater than a second predetermined threshold stored in the memory 44 associated with the hauling machine controller 36.

The amplitude of the impact during the first load cycle may be determined based on an acceleration rate measured by the IMU 32. The second predetermined threshold may be an acceptable amplitude of impact on the hauling machine 26 determined during calibration. If the amplitude of the impact during the first load cycle is less than or equal to the second predetermined threshold, then a height H (FIG. 4) of the end 52 of the implement 40 relative to the dump body 34 may not have to be adjusted, and the flowchart 60 may proceed to block 74.

At block 74, the hauling machine controller 36 may send signals indicative of the desired dumping point 50 to the communication module 42 for communication of the same to the loading machine controller 38. In this instance, the desired dumping point 50 may be the optimized point in (x, y) coordinates, from block 68, that brings the center of gravity proximate the center 56 of the predetermined control zone 54. The loading machine controller 38 may receive the signals from the communication module 42 and position the implement 40 according to the desired dumping point 50.

More specifically, the loading machine controller 38 may be configured to laterally adjust the implement 40 before executing a dump of the payload material 22 during the second load cycle. For example, the loading machine controller 38 may be connected to an electro-hydraulic system, or other type of power system, configured to move the implement 40 and linkages associated therewith. Furthermore, the loading machine controller 38 may be configured to send signals to the electro-hydraulic system in order to position the end 52 of the implement 40 at the desired dumping point 50 for the second load cycle.

If, at block 72, the amplitude of the impact during the first load cycle is greater than the second predetermined threshold, then the height H of the end 52 of the implement 40 relative to the dump body 34 may have to be adjusted, and the flowchart 60 may proceed to block 74. At block 74, the hauling machine controller 36 may determine a desired height for the end 52 of the implement 40 relative to the dump body 34 based on the amplitude of the impact during the first load cycle, as well as predetermined formulas stored in the memory 44 associated with the hauling machine controller 36.

More specifically, the amplitude of impact may be a function of the acceleration rate of loading of the payload material 22 on the dump body 34, which depends on the height H of the end 52 of the implement 40 relative to the dump body 34. Therefore, using the measured acceleration rate and amplitude of impact during the first load cycle and the net load for the second load cycle derived from block 68, the hauling machine controller 36 may use the predetermined formulas to extrapolate the desired height for the second load cycle that reduces the amplitude of the impact of the payload material 22 on the dump body 34. In addition, the hauling machine controller 36 may determine the desired height such that it maintains a predetermined minimum clearance height from the dump body 34. Moreover, the hauling machine controller 36 may determine a z-coordinate for the desired dumping point 50 based on the desired height.

The hauling machine controller 36 may send signals indicative of the desired dumping point 50 to the communication module 42 for communication of the same to the loading machine controller 38. In this instance, the desired dumping point 50 may comprise (x, y, z) coordinates. For instance, the hauling machine controller 36 may generate the desired dumping point 50 from the optimized point in (x, y) coordinates, from block 68, along with the z-coordinate that translates to the desired height calculated to reduce the amplitude of the impact for the second load cycle. The loading machine controller 38 may receive the signals from the communication module 42 and position the implement 40 according to the desired dumping point 50 in three dimensions.

More specifically, the loading machine controller 38 may be configured to vertically and laterally adjust the implement 40 before executing a dump of the payload material 22 during the second load cycle. For example, the loading machine controller 38 may be connected to the electro-hydraulic system, or other type of power system, configured to move the implement 40 and linkages associated therewith. Furthermore, the loading machine controller 38 may be configured to send signals to the electro-hydraulic system in order to position the end 52 of the implement 40 at the desired dumping point 50 for the second load cycle.

It is to be understood that the hauling machine controller 36, the loading machine controller 38, and/or other components of the system 30 may perform any and each of the blocks 62, 64, 66, 68, 70, 72, 74, and 76, illustrated in FIG. 5 above, in different ways than described above. Other configurations for the system 30 may be used to perform the blocks 62, 64, 66, 68, 70, 72, 74, and 76. For example, the hauling machine controller 36 may send signals indicative of the measurements from the IMU 32 to the communication module 42, which may then communicate the same to the loading machine controller 38. Based on such signals, the loading machine controller 38 may then perform the blocks 62, 64, 66, 68, 70, 72, 74, and 76.

INDUSTRIAL APPLICABILITY

In general, the foregoing disclosure finds utility in various industrial applications, such as in earthmoving, construction, industrial, agricultural, and forestry machines. In particular, the disclosed system and method may be applied to excavators, front shovels, electric rope shovels, hydraulic mine shovels, loaders, mining trucks, dump trucks, freight trains, and/or the like.

By applying the disclosed system to a loading machine and a hauling machine, autonomous loading may be implemented. More specifically, the disclosed system can guide autonomous machine loading without computer vision recognition. For example, the disclosed system uses an IMU to measure an impact of a payload material on a dump body of the hauling machine and calculate a net load, an amplitude of impact, and a center of gravity. Based on those measurements and calculations, the system may then provide a desired dumping point for a subsequent load cycle to minimize the impact of the payload material on the dump body.

A loading rate and a dump position may affect both work cycle performance and a life span of machine components. Therefore, by acquiring and analyzing impact information to improve a loading performance for a subsequent work cycle, the disclosed system may more accurately provide for even load distribution and reduced impact on the dump body. In so doing, a reduced wear of machine components and an increased life span of the same may be achieved.

Figure 6:
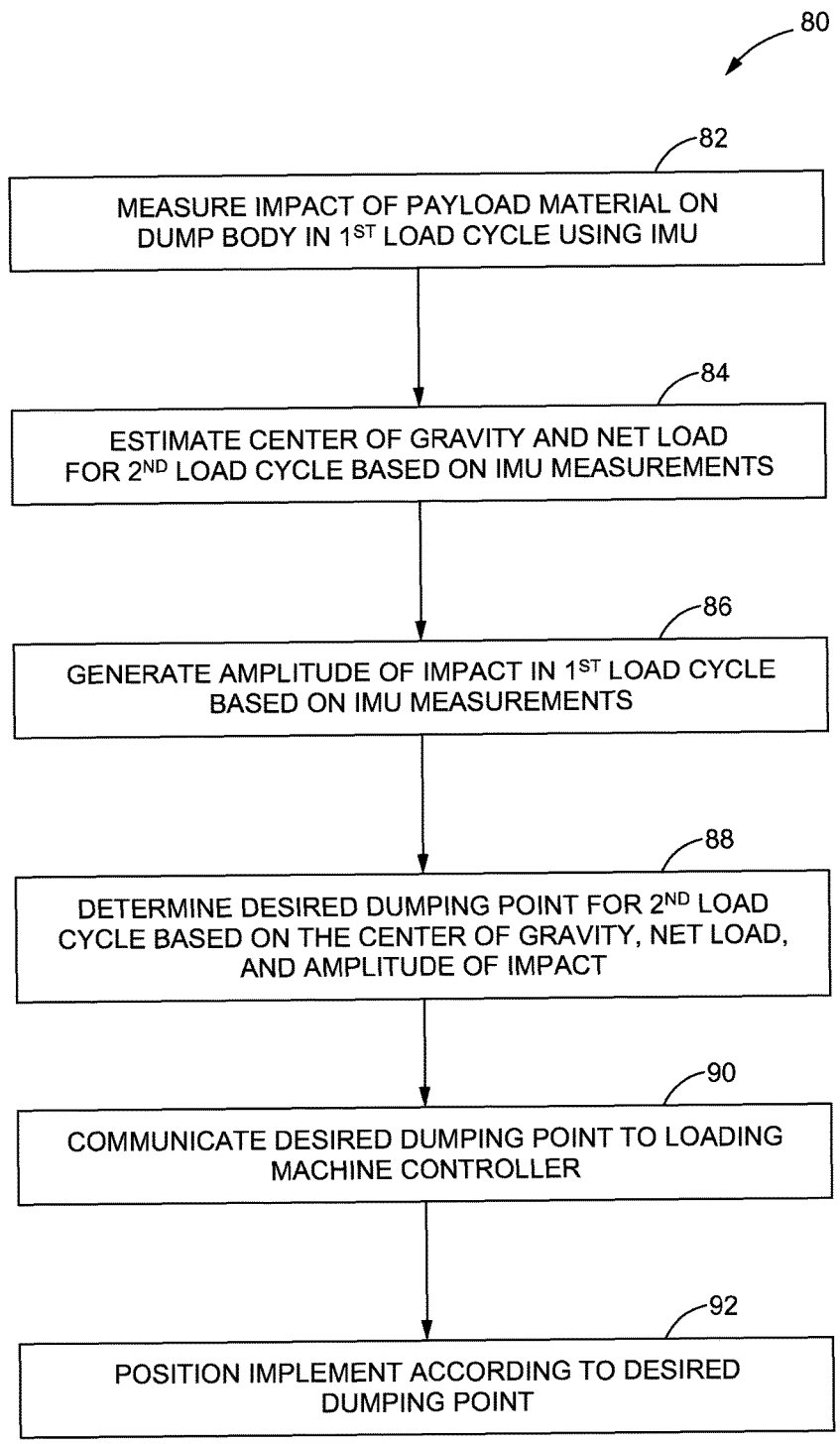
FIG. 6 is another example flowchart illustrating another example process or algorithm for autonomous loading of a payload material from a loading machine onto a hauling machine, in accordance with one aspect of the present disclosure.

Turning now to FIG. 6, with continued reference to FIGS. 1-5, an example flowchart 80 illustrating an example process or algorithm for autonomous loading of a payload material from a loading machine 24 onto a hauling machine 26 is shown, according to one aspect of the present disclosure. At least part of the process may be programmed into (or stored in) the memory 44 associated with the hauling machine controller 36 and the memory 46 associated with the loading machine controller 38. At block 82, an impact of the payload material 22 on a dump body 34 of the hauling machine 26 may be measured in a first load cycle. The measuring may be performed by the IMU 32.

At block 84, a center of gravity and a net load for a second load cycle may be estimated based on measurements from the IMU 32. The estimating may be performed by the hauling machine controller 36. An amplitude of the impact in the first load cycle may be generated based on measurements from the IMU 32, at block 86. The generating may be performed by the hauling machine controller 36. A desired dumping point 50 for the second load cycle may be determined based on the center of gravity, the net load, and the amplitude of the impact in the first load cycle, at block 88. The determining may be performed by the hauling machine controller 36.

The desired dumping point 50 for the second load cycle may be communicated to a loading machine controller 38, at block 90. The communicating may be performed by a communication module 42 associated with the loading machine 24 and the hauling machine 26. At block 92, an implement 40 of the loading machine 24 may be positioned according to the desired dumping point 50 for the second load cycle. The positioning may be performed by the loading machine controller 38.

It is to be understood that the flowchart in FIG. 6 is shown and described as an example only to assist in disclosing the features of the disclosed system, and that more or less steps than that shown may be included in the process corresponding to the various features described above for the disclosed system without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A hauling machine, comprising:
   a dump body;
   an inertial measurement unit (IMU) disposed proximate to the dump body, the IMU configured to:
      measure motion of the dump body from an impact of a payload material on the dump body during a first load cycle, and
      generate impact data based on the measured motion; and
   a controller in operative communication with the IMU, the controller configured to:
      receive the impact data from the IMU,
      estimate a center of gravity, a net load, and an amplitude of the impact of the payload material based on the impact data associated with the first load cycle, and
      determine a desired dumping point of the payload material into the dump body for a second load cycle based on the center of gravity, the net load, and the amplitude of the impact, wherein the desired dumping point is determined to bring the center of gravity after the second load cycle proximate to a center of a predetermined control zone.

2. The hauling machine of claim 1, further comprising a communication module in operative communication with the controller, the communication module configured to communicate with a loading machine that performs autonomous loading of the payload material into the dump body.

3. The hauling machine of claim 1, wherein the controller is further configured to send signals indicative of the desired dumping point to the communication module for communication with the loading machine.

4. The hauling machine of claim 1, wherein the controller is further configured to determine whether a capacity of the dump body is less than a first predetermined threshold stored in a memory associated with the controller, and send signals to stop loading, to the communication module, for communication with the loading machine if the capacity of the dump body is less than the first predetermined threshold.

5. The hauling machine of claim 1, wherein the controller is further configured to determine whether the center of gravity is within the predetermined control zone stored in the memory associated with the controller, and send signals to stop loading, to the communication module, for communication with the loading machine if the center of gravity is outside the predetermined control zone.

6. The hauling machine of claim 5, wherein the controller is further configured to determine whether the amplitude of the impact is greater than a second predetermined threshold stored in the memory associated with the controller, and send signals to adjust a height of an implement, to the communication module, for communication with the loading machine if the amplitude of the impact is greater than the second predetermined threshold.

7. A system for autonomous loading of a payload material from a loading machine onto a hauling machine, the system comprising:
   an inertial measurement unit (IMU) disposed on a dump body of the hauling machine, the IMU configured to:
      measure motion of the dump body from an impact of the payload material on the dump body during a first load cycle, and
      generate impact data based on the measured motion;
   a hauling machine controller in operative communication with the IMU, the hauling machine controller configured to:
      receive the impact data from the IMU,
      estimate a center of gravity, a net load, and an amplitude of the impact of the payload material based on the impact data associated with the first load cycle, and
      determine a desired dumping point of the payload material into the dump body for a second load cycle based on the center of gravity, the net load and the amplitude of the impact, wherein the desired dumping point is determined to bring the center of gravity after the second load cycle proximate to a center of a predetermined control zone;
   a loading machine controller in operative communication with an implement of the loading machine, the loading machine controller configured to cause the implement to load the payload material into the dump body of the hauling machine; and
   a communication module configured to send signals between the hauling machine controller and the loading machine controller,
      the loading machine controller further configured to receive signals indicative of the desired dumping point from the communication module, and position the implement according to the desired dumping point for the second load cycle.

8. The system of claim 7, wherein the desired dumping point includes three-dimensional coordinates for a location of an end of the implement of the loading machine relative to the dump body of the hauling machine.

9. The system of claim 7, wherein the hauling machine controller is further configured to determine whether a capacity of the dump body is less than a first predetermined threshold stored in a memory associated with the hauling machine controller, and wherein the loading machine controller is further configured to stop loading of the payload material if the capacity of the dump body is less than the first predetermined threshold.

10. The system of claim 7, wherein the hauling machine controller is further configured to determine whether the center of gravity is within the predetermined control zone stored in the memory associated with the hauling machine controller, and wherein the loading machine controller is further configured to stop loading of the payload material if the center of gravity is outside of the predetermined control zone.

11. The system of claim 7, wherein the hauling machine controller is further configured to determine whether the amplitude of the impact is greater than a second predetermined threshold stored in the memory associated with the hauling machine controller, and wherein the loading machine controller is further configured to adjust a height of the implement if the amplitude of the impact is greater than the second predetermined threshold.

12. The system of claim 11, wherein the loading machine controller is further configured to proceed with loading of the payload material if the amplitude of the impact is less than or equal to the second predetermined threshold.

13. The system of claim 7, wherein the IMU includes an accelerometer on each corner of the dump body.

14. The system of claim 7, wherein the hauling machine controller is further configured to calculate an open capacity of the dump body by subtracting a current capacity from a full capacity.

15. The system of claim 14, wherein the hauling machine is further configured to determine a minimum of the open capacity of the dump body and a bucket capacity of the loading machine in order to derive a net load for the second load cycle.

16. A method for autonomous loading of a payload material from a loading machine onto a hauling machine, the method comprising:
   measuring motion of a dump body from an impact of the payload material on the dump body of the hauling machine in a first load cycle,
      the measuring being performed by an inertial measurement unit (IMU);
   estimating a center of gravity and a net load for a second load cycle based on measurements from the IMU,
      the estimating being performed by a hauling machine controller;
   generating an amplitude of the impact in the first load cycle based on measurements from the IMU,
      the generating being performed by the hauling machine controller;
   determining a desired dumping point for the second load cycle based on the center of gravity, the net load, and the amplitude of the impact in the first load cycle, wherein the desired dumping point for the second load cycle is determined to bring the center of gravity after the second load cycle proximate to a center of a predetermined control zone,
      the determining being performed by the hauling machine controller;
   communicating the desired dumping point for the second load cycle to a loading machine controller,
      the communicating being performed by a communication module associated with the loading machine and the hauling machine; and
   positioning an implement of the loading machine according to the desired dumping point for the second load cycle,
      the positioning being performed by the loading machine controller.

17. The method of claim 16, further comprising stopping the second load cycle if a capacity of the dump body is greater than a first predetermined threshold, the stopping being performed by the loading machine controller.

18. The method of claim 17, further comprising stopping the second load cycle if the center of gravity is outside of a predetermined control zone, the stopping being performed by the loading machine controller.

19. The method of claim 18, further comprising maintaining a height of the implement of the loading machine if the amplitude of the impact is less than or equal to a second predetermined threshold, the maintaining being performed by the loading machine controller.

20. The method of claim 19, further comprising adjusting the height of the implement of the loading machine if the amplitude of the impact is greater than the second predetermined threshold, the adjusting being performed by the loading machine controller.

* * * * *